T. J. MAYALL.
MANUFACTURE OF ELASTIC HOSE OR TUBING.

No. 39,238. Patented July 14, 1863.

Witnesses
Joseph Gavett
Albert W. Brown.

Inventor
Thos J Mayall

UNITED STATES PATENT OFFICE.

THOMAS J. MAYALL, OF ROXBURY, MASSACHUSETTS.

IMPROVEMENT IN THE MANUFACTURE OF ELASTIC HOSE OR TUBING.

Specification forming part of Letters Patent No. 39,238, dated July 14, 1863.

*To all whom it may concern:*

Be it known that I, THOMAS J. MAYALL, of Roxbury, in the county of Norfolk and State of Massachusetts, have invented certain new and useful Improvements in the Manufacture of Hose or Tubing for Conveying Liquids; and I do hereby declare that the following description, taken in connection with the accompanying drawings, hereinafter referred to, forms a full and exact specification of the same, wherein I have set forth the nature and principles of my said improvements, whereby my invention may be distinguished from all others of a similar class, together with such parts as I claim and desire to have secured to me by Letters Patent.

The present improvements have for their object the formation of lighter and stronger hose or tubing for conducting liquids than heretofore used, and are designed more particularly to take the place of the ordinary rubber or gutta-percha hose now most commonly preferred.

The principal objections to rubber or gutta-percha hose consist in the fact that great strength cannot be obtained without too great an increase in bulk and weight to render its use practicable.

My improvement consists in forming a hose by weaving or braiding around a tube of rubber or gutta-percha, or a tube composed of fibrous materials and coated with an india-rubber or gutta-percha compound, or other water-proof lining, one or more layers of such materials as thread, twine, or wire, it being necessary, however, for the purposes of my invention, that the threads (of whatever material they may be composed) should be woven or braided around the inner tube, and not simply wound around or about the same, as this latter method would not give the strength desired, the threads, moreover, being liable to become loose and to unwind by severe usage. The outer covering of woven or braided materials may, if desirable, be saturated with or have incorporated in it rubber or gutta-percha compounds; but I do not consider this as absolutely essential. This form of hose combines the great requisites necessary in tubes for conducting liquids under pressure—viz., lightness and strength, and particularly resistance to transverse strains.

Figure 1:
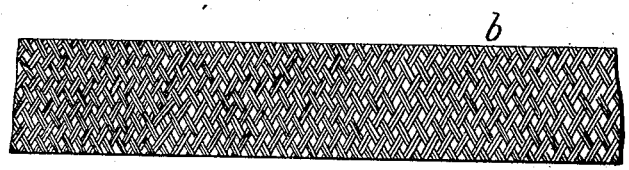
Figure 2:
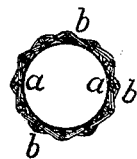

One form of my improved hose is represented in the accompanying drawings, of which Figure 1 is a plan or top view, and Fig. 2 a transverse section. This precise form of hose, however, it is evident, need not be adhered to, as there are many obvious modifications thereof that may be made without departing from the principles of my invention. For instance, the hose thus formed may be coated with a coating of rubber or gutta-percha cement, or a tube of rubber or gutta-percha may be slipped over the woven covering.

I will now proceed to describe in detail one of the modes I have found most preferable for making my improved hose. I take a mandrel, of suitable size for the required bore of the hose, and pass over the same a tube, *a a*, of india-rubber or gutta-percha, made in any proper manner. Around this is woven or braided twine, wire, or other similar threads, so as to form a firm and uniform outer tube, *b b*, thereon. The weaving or braiding may be done either by hand or by machinery. The outer tube, *b b*, may, if desirable, be coated with a cement of india-rubber or gutta-percha, or may be covered by an outer of the same materials.

Having thus described my improvement, what I claim as my invention, and desire to have secured to me by Letters Patent, is—

A hose or tubing in which the periphery of one or more of its layers is formed by weaving or braiding upon an inner tube or lining an outer tube made of twine, wire, or other strands or threads, substantially as set forth.

THOS. J. MAYALL.

Witnesses:
JOSEPH GAVETT,
ALBERT W. BROWN.